United States Patent
Cain et al.

(10) Patent No.: US 7,761,530 B2
(45) Date of Patent: Jul. 20, 2010

(54) CONFIGURATION CHANGE MANAGEMENT TOOL

(75) Inventors: Nigel Cain, Redmond, WA (US); Andy Hopper, Bellevue, WA (US); Dileep Kumar, Redmond, WA (US); Bahadir Onalan, Bellevue, WA (US); Ashvin Sanghvi, Sammamish, WA (US); Pritam Sharma, Sammamish, WA (US); Giedrius Zizys, Redmond, WA (US); Kenneth Van Hyning, Snoqualmie, WA (US); R. Syam Kumar, Redmond, WA (US); Andrea Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 11/800,702

(22) Filed: May 7, 2007

(65) Prior Publication Data
US 2008/0281833 A1 Nov. 13, 2008

(51) Int. Cl.
*G06F 15/16* (2006.01)
(52) U.S. Cl. ...................... 709/213; 707/100
(58) Field of Classification Search .............. 707/1–10, 707/100; 709/200–202, 213
See application file for complete search history.

(56) References Cited

U.S. PATENT DOCUMENTS 5,590,270 A 12/1996 Tsukuda et al.
(Continued)

OTHER PUBLICATIONS

"AccuWork", http://www.accurev.com/issue-tracking.html.
"HP OpenView Change and Configuration Management Solutions", http://whitepapers.techrepublic.com.com/whitepaper.aspx?docid=117133.
(Continued)

*Primary Examiner*—Moustafa M Meky
(74) *Attorney, Agent, or Firm*—Russell S. Krajec; Krajec Patent Offices, LLC

(57) ABSTRACT

A change management system for managing configurable devices such as computer systems uses a set of rules for validating change requests, linking change requests, and determining inconsistencies within various configuration states. Analysis and validation may happen at the time the change request is created with respect to the current environment, as well as analysis and validation with respect to other pending requests and proposals, and historical actual states. The maintenance of accurate and consistent state and change information may enable various automated tools to analyze and manipulate change requests, including analysis of future desired states, historical actual states, pending change requests, and current state. The change request may be processed through an approval cycle all the while being incorporated into a scheduling system that may be used to detect inconsistent, illogical or harmful configurations in potential future configurations.

19 Claims, 5 Drawing Sheets

U.S. PATENT DOCUMENTS

| | | | |
|---|---|---|---|
| 6,256,773 | B1 | 7/2001 | Bowman-Amuah |
| 6,775,376 | B2 * | 8/2004 | Hsieh et al. ................ 379/230 |
| 6,901,580 | B2 * | 5/2005 | Iwanojko et al. ............ 717/121 |
| 7,024,548 | B1 | 4/2006 | O'Toole, Jr. |
| 7,054,885 | B1 | 5/2006 | Hoffman et al. |
| 7,103,871 | B1 | 9/2006 | Kirkpatrick et al. |
| 7,386,549 | B2 * | 6/2008 | Bickford et al. ............... 707/8 |
| 2004/0002880 | A1 | 1/2004 | Jones |
| 2005/0114479 | A1 | 5/2005 | Watson-Luke |
| 2006/0004875 | A1 | 1/2006 | Baron et al. |
| 2006/0161879 | A1 | 7/2006 | Lubrecht et al. |
| 2007/0061191 | A1 | 3/2007 | Mehrotra et al. |
| 2007/0100892 | A1 * | 5/2007 | Kephart et al. ............. 707/200 |
| 2007/0112864 | A1 * | 5/2007 | Ben-Natan .................. 707/200 |
| 2009/0222540 | A1 * | 9/2009 | Mishra et al. ............... 709/222 |

OTHER PUBLICATIONS

"Service Management Functions", http://www.microsoft.com/technet/solutionaccelerators/cits/mo/smf/smfcfgmg.mspx.

Hill, et al., "Facilitating Compliance through a Configuration Management Database", http://www.bmc.com/USA/Promotions/attachments/BMC_BPWP_CMDB_Comp.pdf.

* cited by examiner

CONFIGURATION CHANGE MANAGEMENT TOOL

BACKGROUND

Configuration management of computer systems is one of the biggest tasks facing information technology managers. Many decisions are made based on the configuration details of many different computer systems throughout an organization, including dispatching technicians for repair or upgrade tasks, deploying an upgrade strategy or new software applications across a wide array of devices, or reconfiguring multiple server platforms for an enterprise.

In many cases, a configuration management database is used to store data about individual systems or devices. Decisions are often based on the contents of the database, but maintaining an up to date database is often a low priority for the busy technicians who perform the actual upgrades or administer changes to the systems.

Further, request for changes may be difficult to track in some instances, especially when the change requests may be in process. In larger companies with complex approval systems, a device may have multiple change requests pending that may adversely affect a proposed change request.

SUMMARY

A change management system for managing configurable devices such as computer systems uses a set of rules for validating change requests, linking change requests, and determining inconsistencies within various configuration states. Analysis and validation may happen at the time the change request is created with respect to the current environment, as well as analysis and validation with respect to other pending requests and proposals, and historical actual states. The maintenance of accurate and consistent state and change information may enable various automated tools to analyze and manipulate change requests, including analysis of future desired states, historical actual states, pending change requests, and current state. The change request may be processed through an approval cycle all the while being incorporated into a scheduling system that may be used to detect inconsistent, illogical or harmful configurations in potential future configurations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
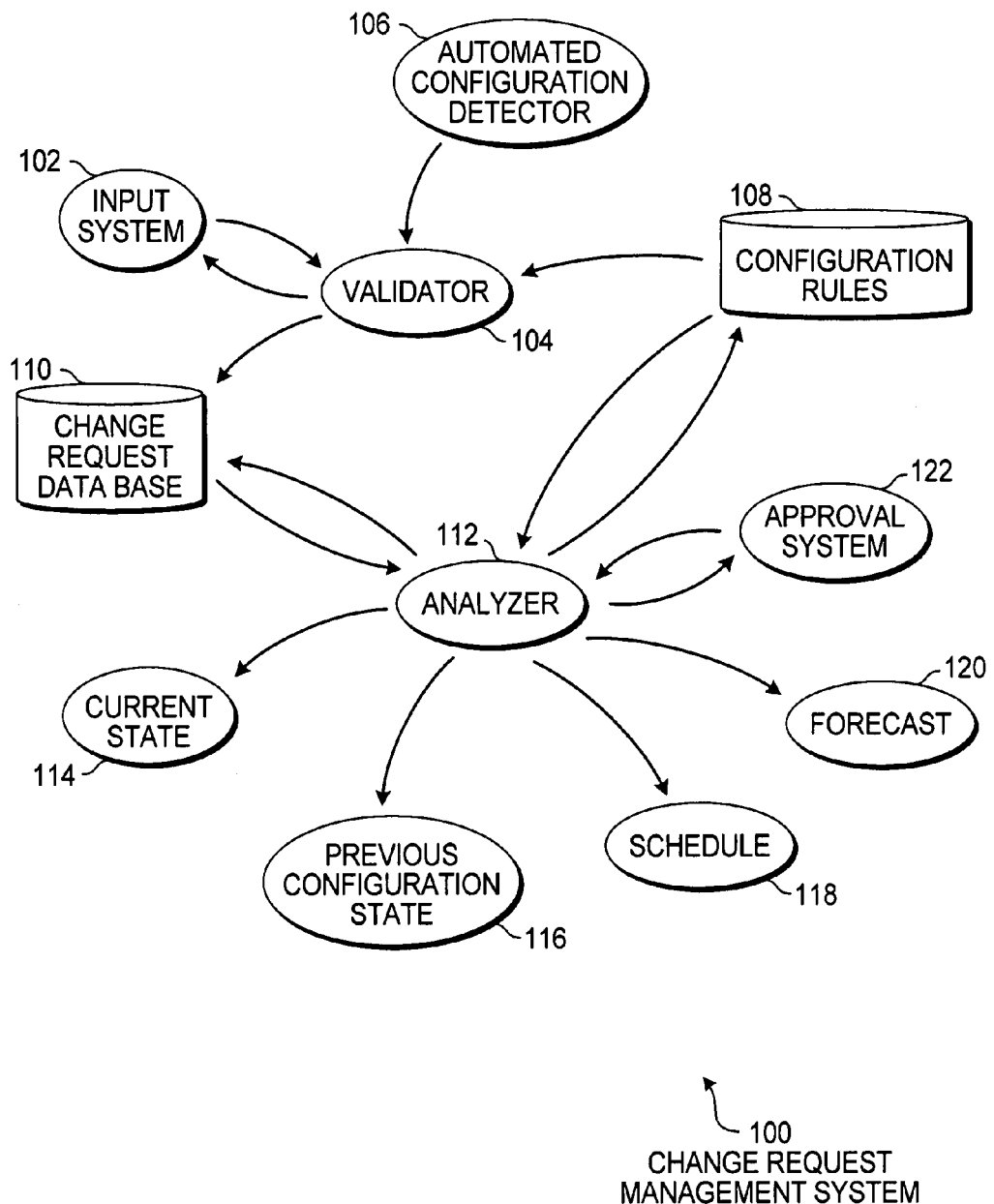
FIG. 1 is a diagram of an embodiment showing a change management request system.

A change management data base uses standardized change requests to perform several automated processes, including validation of change requests, establishing links between change requests, and various time-dependant analyses, including past, present, and future configurations. Change requests may affect various configuration items, which may be defined for any component to be tracked.

The change management data base may track various configuration items for a wide array of configurable devices or components, as may be found in an information technology environment. Such devices or components may include hardware, software, and services components that may be deployed across an organization. Different implementations may use different granularity of configuration items, such as tracking a memory component installed in a device to tracking software that is deployed across a large number of devices.

A change request may follow a lifecycle that may include a proposal phase, an approved phase, a scheduled phase, and a completed phase. During the lifecycle, the validity of a change request may be analyzed by analyzing the potential effects of other change requests on a configuration item. Analysis of future configuration states may involve determining the aggregated effects of any pending, approved, scheduled, or completed change requests on the configuration item.

Change requests may have dependencies on other change requests, and those dependencies may be used for scheduling change requests and determining validity of future states. Generating a schedule may include placing grouping parallel change requests or sequencing sequential change requests. Future configuration states may be determined by applying pending, approved, and scheduled change requests to a current configuration.

By having a well defined and useful system for proposing and approving change requests, a change request that is issued to a technician may be well defined at the time the technician performs the action. Rather than documenting the action after the fact, the technician may merely mark the change request complete. This may take the considerable burden of documenting the task off of the technician, which may result in a more accurate and current configuration management database.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a change management request system. The embodiment 100 is an example of a system that may be used to generate and track change requests for various configuration items, such as those that may be used to manage a group of configurable devices. An example of such devices may be computer systems, server devices, network management devices, network appliances, or other computing and communication devices that may be found in an organization. A typical implementation of embodiment 100 may be for the management of information technology devices in a company, organization, or other enterprise.

The system of embodiment 100 may be used to generate change requests, validate the change requests, and store the change requests in a database. Various analysis functions may use the information in the database to manage the configuration of various devices, including determining current and historical configurations as well as run various analyses to determine future configurations and schedule individual or groups of change requests.

Change requests may be created and then enter an approval lifecycle through which a change request may move from proposed to approved, scheduled, and completed. Each change request may define a desired state for a configuration item. In some instances, a change request may be sufficient to define specific steps that are to be taken to implement a change, while in other instances, additional tasks may be defined to implement the change.

A configuration item may be any item that may be tracked or acted upon by a change request. In some instances, a configuration item may be a particular parameter concerning a specific device, such as the amount of random access memory in a device. In other instances, a configuration item may span multiple devices or multiple computer applications, such as a configuration item for a site license upgrade of a suite of applications that operate on many different computer systems. A configuration item may vary widely in complexity, size, and type, from an entire system including hardware, software, and documentation to a single software module or a minor hardware component. Each embodiment may have different definitions of configuration items.

An input system 102 may create a change request. The input system 102 may be any type of mechanism by which a change request may be created. In many embodiments, the input system 102 may have a user interface through which a user may create a change request. Other embodiments may have automated or semi-automated tools for creating a change request.

A change request may be defined in a manner that is adaptable to automated analysis. For example, a change request may be arranged in a specific format or using predefined fields that are consistent across multiple change requests. One manner for creating such change requests is to use an application that generates a standardized change request. A change request may be defined in any computer-readable format, including XML.

After a change request is created, it may be validated by a validator 104. The validator 104 may determine if the change request is valid using various mechanisms, including analyzing if the change request is possible for a particular device, determining if the change request actually produces the desired result, and determining if additional changes are to be added, among other functions.

The validator 104 may use an automated configuration detector 106 to determine a current configuration of a device. The current configuration may be compared to a desired configuration defined by the change request to determine specific actions to be performed.

A set of configuration rules 108 may be used by the validator 104 to determine if a proposed change request may be possible. For example, a change request may request a memory upgrade for a device beyond that which the device is capable of handling. In another example, a change request may request installation of a computer operating system but the device may not be able to operate with the operating system unless other changes are also made, such as increasing the storage media on the device.

The configuration rules 108 may define physical limitations for specific devices, such as a minimum hardware configuration to operate a specific application. The configuration rules 108 may also include best practices established for an organization, such as a standard hardware or software configuration for a desktop computer or a set of applications that are used company-wide.

The configuration rules 108 may include rules pertaining to the management and organization of devices within a company. For example, rules may define ownership or responsibilities within an organization of specific devices, licenses, software, or services. For example, a change request to transfer a server from one datacenter to another datacenter may include analysis of the responsible parties for administrating the server, budget considerations for maintaining the server, or other company-specific information. Such information may be validated by configuration rules 108 that define how such interactions may be performed.

Configuration rules 108 may be used to determine if a change request actually produces the desired result. For example, a change request may be created to upgrade an operating system on a desktop computer. If the computer is unable to operate with an upgraded operating system, the change request may be denied by the validator 104 using the configuration rules 108.

In some instances, the validator 104 may use the configuration rules 108 to determine if additional changes may be performed to achieve a specific result. Using the example of upgrading an operating system on a desktop computer, the configuration rules 108 may be used to determine that additional disk space and upgraded memory may be added to a change request. In some instances, a separate change request may be created for additional items, while in other instances, the additional items may be added to an original change request.

Once a change request is validated by the validator 104, the change request may be added to a change request database 110. The change request database 110 may store the change requests for an entire enterprise or group for which the change request management system of embodiment 100 operates.

An analyzer 112 may perform multiple tasks with the change request database 110, including determining a current state 114, a previous configuration state 116, scheduling functions 118, forecasting 120, and a change request approval system 122. In some embodiments, the analyzer 112 may be a single computer application or service that performs multiple functions. In other embodiments, one or more of the various functions may be separate applications or separate devices that operate against the change request database 110.

A current state 114 of configuration items in a database may be determined by analyzing the completed change requests in the change management database 110. Additionally, the current state 114 may include a list of change requests that are pending, scheduled, or approved. Such information may be useful in managing and scheduling tasks for technicians, budgeting purchases, analyzing user trends or desires, or other functions.

Previous configuration states 116 may be determined by analyzing completed change requests for a specific period of time. Such information may be useful in determining a rollback configuration of a system, for diagnosing problems, or any other analysis using past configuration data.

Schedules 118 may be generated by linking various change requests that are dependent on each other. In some cases, two or more change requests may have parallel dependencies, where both change requests are to be scheduled simultaneously. In other cases, two or more change request may have serial or sequential dependencies, where the change requests may be performed in series.

Dependencies between change requests may be created in any fashion, including manually linking change requests and automatic linking. In an automated linking embodiment, an analysis tool may gather related change requests and determine if one change request is dependent on another change request in order to create a valid configuration. In another embodiment, a second change request may be automatically generated in response to a first change request to avoid an invalid configuration of a device. In such an embodiment, a second change request may be automatically linked to the first change request.

In many embodiments, a change request may have an implementation date or range of dates assigned to the change request. A scheduling application may use the assigned dates in conjunction with dependencies between change requests to generate a schedule for implementing the change requests.

Forecasts 120 may be created by analyzing pending, approved, and scheduled change requests to generate a future configuration state. In some instances, a future configuration state may be analyzed to determine if a change request may be valid or invalid.

For example, a change request may be generated to relocate a server from a rack in a first datacenter to a specific rack in a second datacenter. The change request may be valid, since space may exist in the rack in the second datacenter and the change request may be approved. However, another change request may be proposed to remove the rack from the second datacenter. By analyzing a future configuration of the server using the proposed, approved, and scheduled change requests, the future configuration may not be valid as the rack in the second datacenter may potentially be removed from service and be unavailable when the server is relocated.

The changes requests in the change management database 110 may undergo an approval system 112 for managing, budgeting, and coordinating the various change requests. In many embodiments, change requests may have a process state that may include "proposed", "approved", "scheduled", and "completed". An approval system 112 may be any mechanism by which the various change requests may have their status monitored and changed. For example, an approval system 122 may have an email notification system or web-based user interface through which a manager or group of managers may approve individual or groups of change requests.

Embodiment 100 may be implemented in any type of architecture. In some embodiments, a single, standalone computer may host the embodiment 100, including the various input applications, configuration rules, databases, and analysis tools.

In other embodiments, a distributed architecture may be employed. For example, the input system 102 may use a web-based interface that various users may access over a network or the Internet. Automated configuration detectors 106 may reside on individual devices that are monitored or may be a service accessed from a network server. In some embodiments, the configuration rules 108 and change request database 110 may be located on a local server or may be located on a server accessed over the Internet and shared by various change request management systems. Similarly, some or all of the analysis applications may be web-based services or locally operating applications. Other architectures may also be used.

Figure 2:
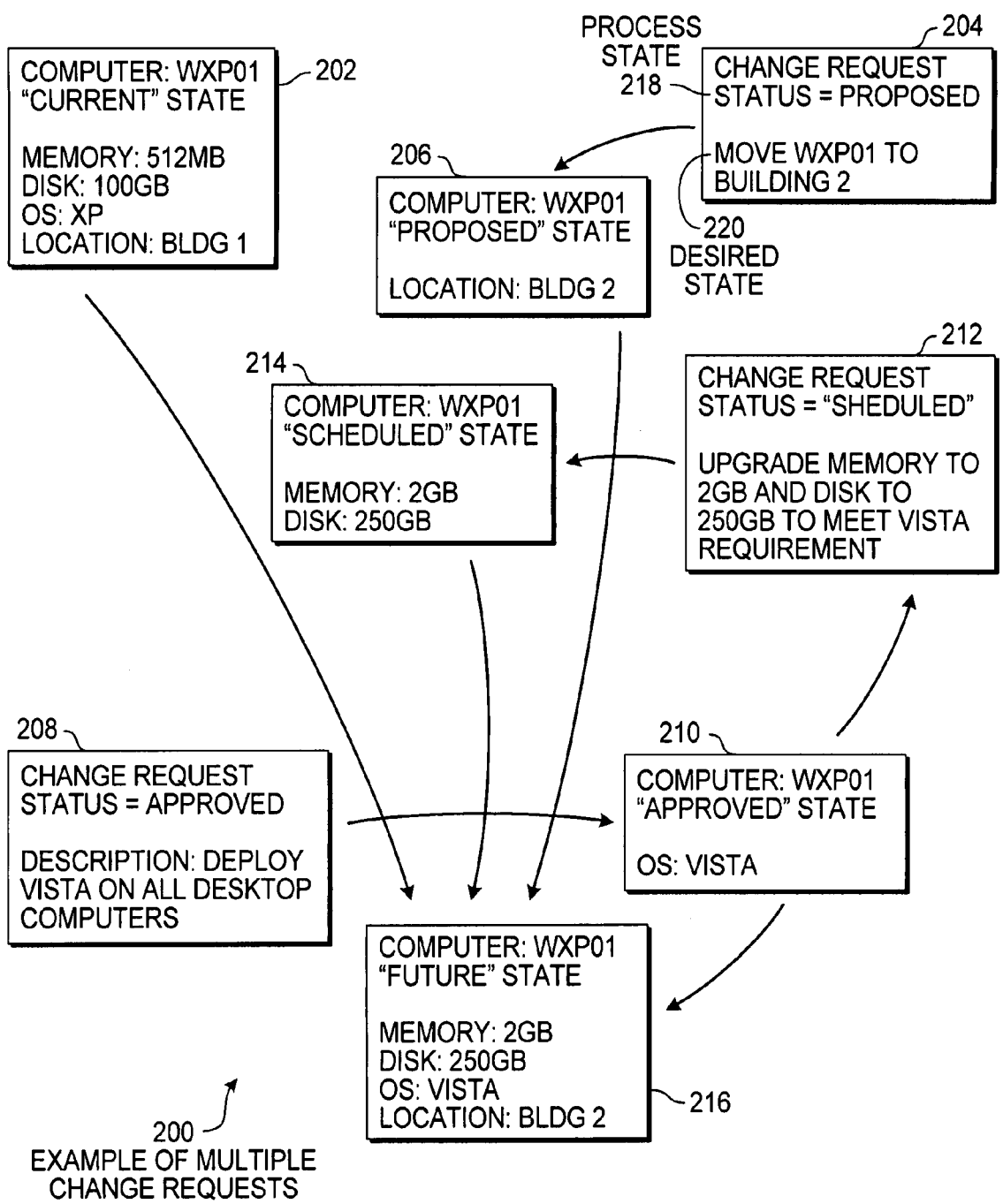
FIG. 2 is a diagram of an example of multiple change requests and their interaction.

FIG. 2 is a diagram illustration of an embodiment 200 showing an example of a set of change requests and various configurations of a device. The example shown here is intended to illustrate some aspects of change requests and the various processes that may be applied to the change requests. Embodiment 200 is a simplification of a typical embodiment.

Embodiment 200 illustrates several change requests that relate to a device of a computer WXP01. In block 202, computer WXP01 is shown with its "current" state of having 512 MB of memory, 100 GB of disk, and operating system of XP and a location in Building 1.

Change request 204 has a process state 218 of "proposed" and has a desired state 220 of a location of Building 2. This results in a proposed state 206 of a location of Building 2.

The change request 204 may be a mechanism by which a state of a device is changed. When a change request 204 goes through an approval process and is executed by a technician, the change would be implemented and the "current" state of the device may be updated.

Change request 208 has a process state or status of "approved" and a desired state of Vista operating system deployed on all desktop computers. Change request 208 is an example of a change request for a configuration item that spans many different devices, in this case all desktop computers, of which WXP01 is part of the set. The change request 208 has been "approved" but not yet implemented and results in the state 210 for computer WXP01, where the desired state is an operating system of Vista.

By running a validation tool or performing other analysis, change request 212 may be generated to upgrade the memory and disk space on WXP01 in order to meet a minimum requirement for the operating system Vista. The change request 212 may be "scheduled" and result in a state 214 for computer WXP01.

The current state of computer WXP01 is illustrated in block 202, however several change requests are in process for the device. By combining all of the pending change requests, a future state of computer WXP01 may be determined in block 216. The future state may be determined by aggregating all of the change requests 204, 208, and 212 together.

In some embodiments, a future state may be created using a subset of pending change requests. For example, a future state may be determined using "approved" and "scheduled" change requests but not "proposed". In other embodiments, a future state may be determined by creating an estimated schedule for pending change requests and selecting a day on the schedule to determine a future state.

A future state of a device may be useful when determining if a potential change request may be valid. For example, a change request may be pending that removes a device from service. When a user creates a change request that would perform an upgrade for memory, a validation analysis using future states of the device may identify that the device is planned to be removed from service and the memory upgrade request may be denied.

Some embodiments may perform validation testing on future states to determine if a set of change requests result in a valid configuration. For example, a validation analysis of change request 208 which approved an operating system upgrade may have resulted in change request 212 that upgraded memory and disk space to accommodate the change request 208. In some embodiments, change request 212 may be linked to change request 208 so that the memory and disk upgrades are performed prior to or simultaneously with the operating system upgrade.

Figure 3:
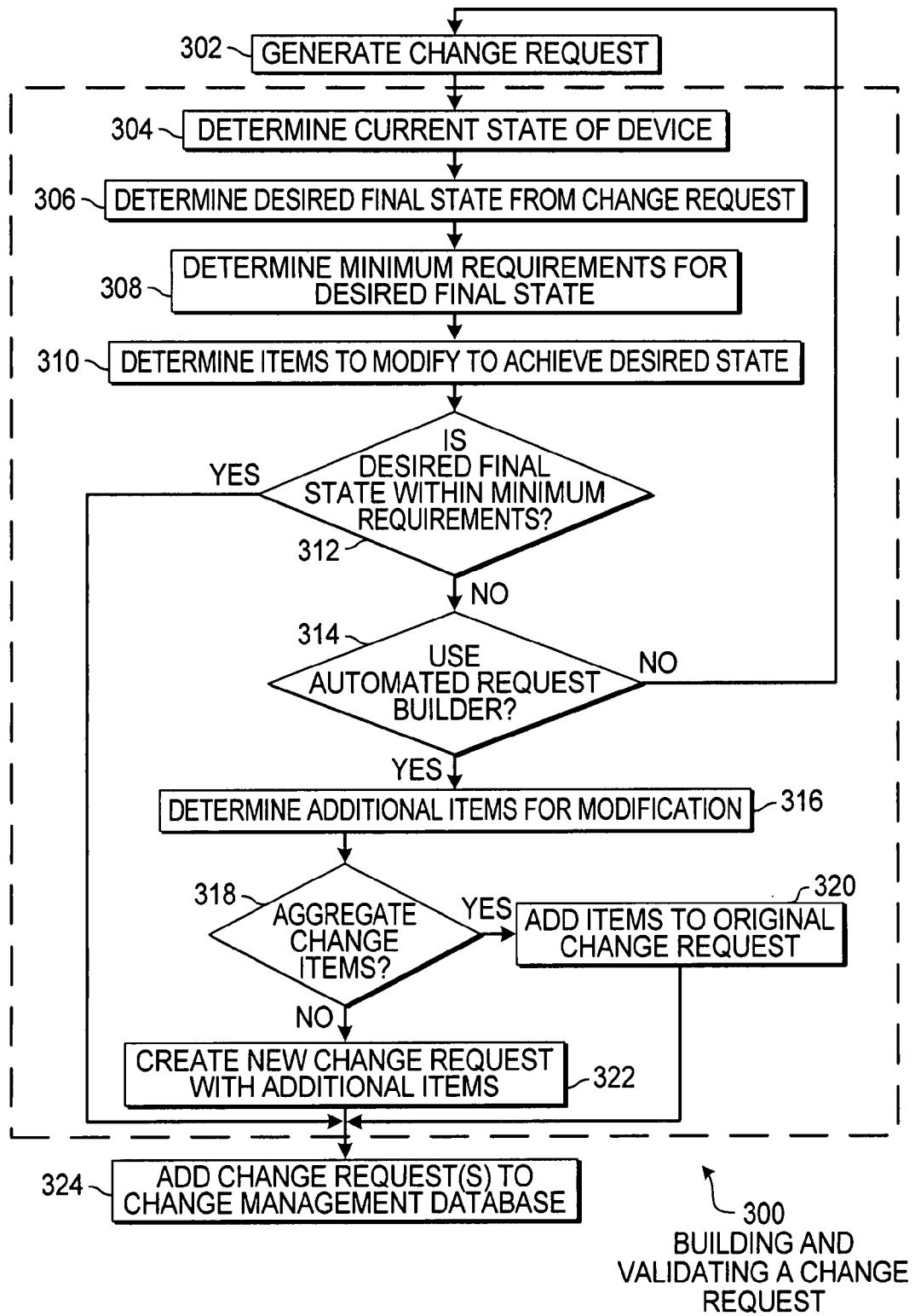
FIG. 3 is a flowchart illustration of an embodiment showing a method for building and validating a change request.

FIG. 3 is a flowchart illustration of an embodiment 300 showing a method for building and validating a change request. Once a change request is created, it is analyzed by a validation sequence 326 that determines if the change request is adequate or if additional changes may be added. Embodiment 300 uses an automated request builder to determine additional items that may be added to a change request that is being analyzed or create an additional change request.

A change request is generated in block 302. The change request may be created using any mechanism, including manual creation or automated tools. In many embodiments, a user interface may be available for a user to enter specific fields that may define a change request. A typical such embodiment may have a web-based interface that uses a form or other input mechanism to capture change request data. Such input tools may also perform an initial check of data validity, for example ensuring that a minimum set of information is present or checking that values are within certain ranges.

A current state of the device affected by the change request is determined in block 304. The current state may be manually entered by a user who creates a change request, but may also be determined by automated mechanisms. In some embodiments, a configuration tool may analyze the device to be modified to determine detailed configuration information. In other embodiments a current configuration of a device may be derived from a configuration management database.

A desired final state of the device is determined from the change request in block 306.

In block 308, a set of minimum requirements for the desired final state is determined from a group of configuration rules or other configuration data. In some instances, minimum configuration data may be recommended minimum configuration data for a specific desired configuration that is set by a manufacturer or may be a set of local preferences for a minimum configuration.

By comparing the minimum requirements for a desired state to the current configuration, a set of items to modify are determined in block 310. The items to modify may or may not be defined in the change request.

For example, a user may create a change request to add a network-intensive application to a computer. In analyzing the current state of the device, it may be determined that the network that serves the device is operating at capacity. One of the minimum requirements for the application from block 308 may be connection to a network with a specific amount of unused bandwidth. The comparison performed in block 310 may determine that a different network connection or an upgrade to an existing network may also be an item to modify.

If the desired state is not within the minimum requirements in block 312, an automated request builder may be invoked in block 314. If the automated request builder is not used in block 314, the process may revert back to generating a change request in block 302.

If the automated request builder is invoked in block 314, additional items to be modified are identified in block 316. In the example above with a network-intensive application, one of the additional items to modify may include upgrading a network connection for the device or connecting the device to another network.

After the additional items are identified in block 316, the items may be aggregated in block 318 and added to the original change request in block 320. If the items are not aggregated in block 318, a new change request with the new items is created in block 322.

Some embodiments may automatically determine if additional items are aggregated into an existing change request. For example, if a change request for a simple upgrade also triggers other, more costly changes that are a prerequisite for the initial request, a separate change request may be created for the additional items. If a change request triggers a minor item that has little or no cost impact, the additional items may be added to the existing change request. In some instances, a set of rules may be used to analyze if a new change request is to be created or not. Some embodiments may enable a user to select whether or not to create an additional change request.

After the change request(s) are created, analyzed, and validated, they are added to the change management database in block 324.

The validation sequence 326 may be used during other analyses of change requests. For example, as several change requests are created for a specific device, a validation sequence 326 may be performed for the state of a device after two or more pending changes are implemented. By analyzing and validating the effects of two or more change requests, inconsistencies or problems between multiple change requests may be identified and eliminated.

Figure 4:
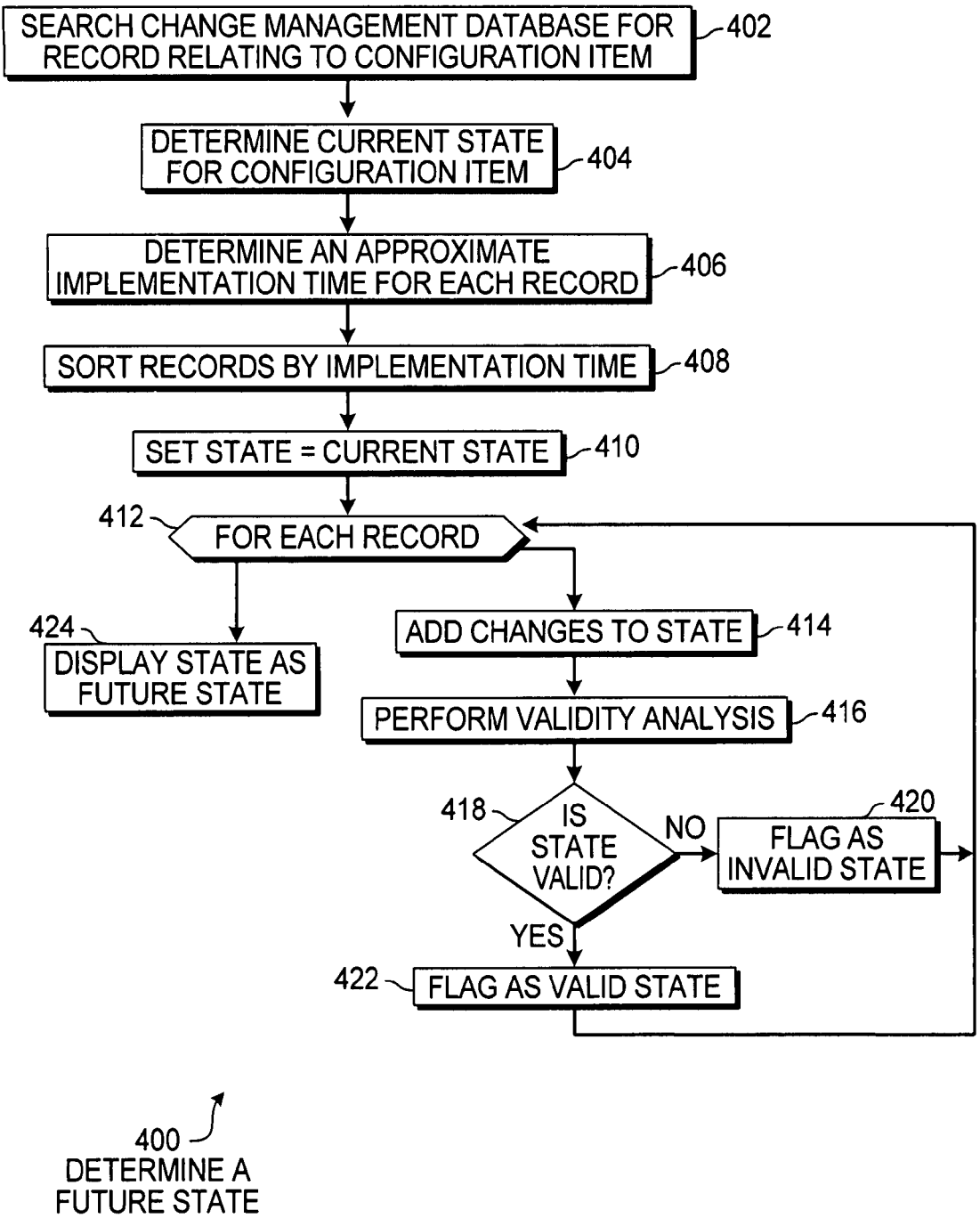
FIG. 4 is a flowchart illustration of an embodiment showing a method for determining a future state.

FIG. 4 is a flowchart illustration of an embodiment 400 showing a method for determining and analyzing a future state. Embodiment 400 is one example of how multiple change requests may be aggregated to determine a potential future state of a configuration item if each change request is implemented. Records relating to a configuration item or device are retrieved and sorted based on a potential sequence of implementation. The current state of the item is updated by applying the changes indicated in each change request to determine a final state for the configuration item or device.

A configuration item may be any item that may be tracked in a configuration management database. Often, a configuration item may be a device, but a configuration item may also include individual hardware or software components attached to the device. In some instances, a configuration item may include items that span multiple devices, such as a license for a software application or service that is shared across many devices.

A change management database is searched for records relating to a configuration item in block 402. In some instances, all records relating to a configuration item may be searched, while in other instances a filter may be applied to retrieve a portion of the records relating to a configuration item.

For example, all records relating to a specific device may be retrieved when analyzing the scope of potential actions that may be performed on the device. Another analysis may only retrieve those change requests that have been approved and scheduled, omitting those that have been proposed but not approved. Similarly, a set of records occurring before or after a specific date may be retrieved for other analyses. The specific parameters used to search and filter results may be dependent on the specific embodiment.

The current state of a configuration item is determined in block 404. In some instances, the current state may be determined using an analysis tool that communicates with the configuration item or device and assesses various data about the current state of the item. In other instances, the current state of a device or configuration item may be determined from the configuration management database.

For each record that has been retrieved, an approximate implementation time may be determined in block 406. In some instances, a scheduled date or time may be present in a record, while in other instances some estimated sequence may be used. The records are sorted by implementation time in block 408.

The state of the item or device is set to the current state in block 410.

For each record in block 412, the changes in the record are added to the state in block 414. A validity analysis is performed in block 416. The validity analysis may be similar to the validity analysis 326 illustrated in embodiment 300.

If the state is not valid in block 418, the state is flagged as invalid in block 420. In some embodiments, the process may halt when an invalid configuration is found, while in the present embodiment, the process returns to block 412. When an invalid configuration is found, some embodiments may attempt to re-sort the change request records to determine a sequence of change requests that result in a valid configuration.

If the state is valid in block 418, the state is flagged as a valid state in block 422 and the process returns to block 412. The final state is displayed in block 424 as the future state of the configuration item or device.

Figure 5:
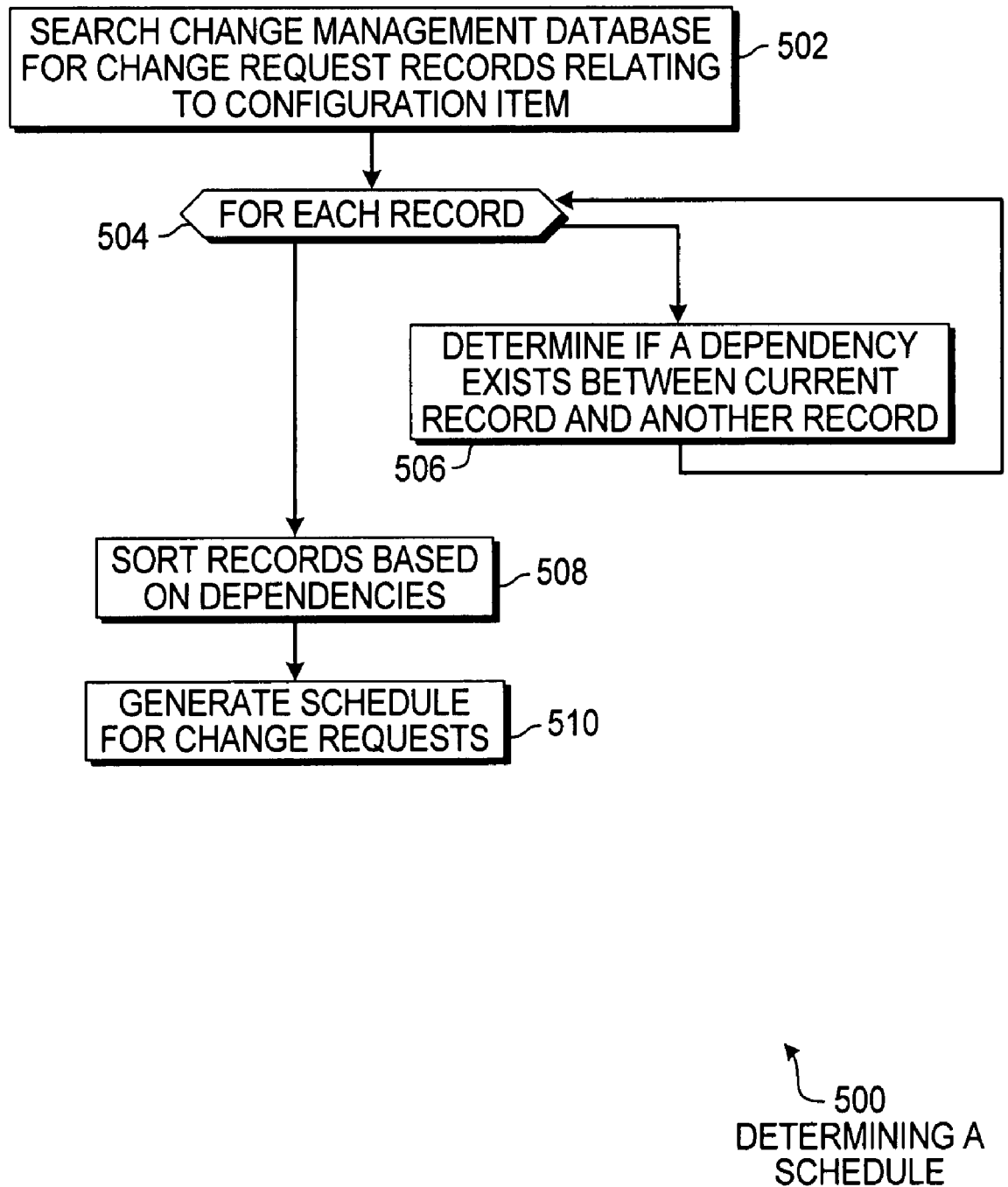
FIG. 5 is a flowchart illustration of an embodiment showing a method for determining a schedule.

FIG. 5 is a flowchart illustration of an embodiment 500 showing a method for determining a schedule. A scheduling activity may use dependencies between two or more change requests to sort change requests into a logical order for implementation.

A change management database is searched for relevant records in block 502. In a typical scenario, a configuration item or device may be selected and records relating to the device or item retrieved. The change requests may be filtered by process state, date, or other factor.

For each record in block 504, dependencies between the record and other records are determined in block 506. Dependencies may be determined by any appropriate mechanism. In some instances, a dependency between two or more change request records may be defined at the time one of the change requests is created.

The dependencies between change requests may be sequential, where one change request is performed before another, or parallel where two or more change requests are performed simultaneously.

After dependencies between the change requests are determined, the change requests are sorted based on the dependencies in block 508 and a schedule generated in block 510 using the dependencies.

One method for determining if a dependency exists between two or more change requests is to determine if an invalid state exists when a first change request is performed. If such is the case, a dependency may exist when another change request would render a valid state. In such instances, a parallel dependency may exist between the two change requests.

A sequential dependency may exist when a first change request has a minimum configuration state before performing the change request and a second change request puts the configuration item or device in the minimum state for the first change request.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
    a change request database comprising change requests, each of said change requests comprising:
        at least one affected device;
        a desired state for said at least one affected device; and
        a process state;
    an analysis engine adapted to analyze said change request database and further adapted to:
        validate a change request using validation rules by a method comprising:
            determining said desired state for said at least one affected device;

determining a change action for said at least one affected device;

determining a minimum configuration state for said at least one affected device;

determining a current state for said at least one affected device; and determining that said change request is valid when said current state with said change action are at least said desired state and said desired state is within said minimum configuration.

2. The system of claim 1, said analysis engine further adapted to:

determine a difference between said current state with said change action and said desired state; and create a new change request comprising said difference.

3. The system of claim 2, said new change request comprising said first change request.

4. The system of claim 1, said process state comprising at least one of a group composed of: proposed, approved, scheduled, in process, and completed.

5. The system of claim 4, said analysis engine further adapted to:

determine an inconsistency between a first change request having a first process state and a second change request having a second process state, said first process state not being the same as said second process state.

6. The system of claim 1, said analysis engine further adapted to:

determine at least one dependency between a first change request and a second change request; and define a sequence comprising said first change request and said second change request based on said dependency.

7. The system of claim 6, said dependency comprising at least one of a group composed of: sequential and parallel.

8. A method comprising:

generating a first change request, said change request comprising a process state;

storing said first change request in a change management database;

determining a desired state for a device from said first change request;

determining a change action for said device;

determining a current state for said device;

analyzing said first change request to determine a minimum configuration state for said at least one affected device using said desired state; and determining that said first change request is valid when said current state with said change action are at least said desired state and said desired state is within said minimum configuration.

9. The method of claim 8, said determining a current state for said device comprising analyzing said device with an automated analysis tool.

10. The method of claim 8, said determining a current state for said device comprising referencing said configuration management database.

11. The method of claim 8 further comprising:

searching said change management database to find a second change request relating to said device.

12. The method of claim 11 further comprising:

determining a future state for said device, said future state being determined using said change request and said second change request.

13. The method of claim 12 wherein said first change request has a dependent link to said second change request.

14. A computer readable medium comprising computer executable instructions adapted to perform the method of claim 8.

15. A method comprising:

retrieving a first change request from a change management database, said first change request comprising a process state and being related at least in part to a first device, said first change request further comprising a first future state of said first device;

retrieving a second change request from said change management database, said second change request comprising a second future state of said first device;

determining that said second change request has a dependency on said first change request;

defining a link between said first change request and said second change request; and defining a schedule comprising said first change request and said second change request.

16. The method of claim 15 further comprising:

defining a future state of said first device based on said first change request and said second change request.

17. The method of claim 15 further comprising validating said first change request.

18. The method of claim 17, said validating comprising:

determining said first future state for said first device;

determining a change action for said first device;

determining a minimum configuration state for said first device;

determining a current state for said first device; and determining that said first change request is valid when said current state with said change action are at least said desired state and said desired state is within said minimum configuration.

19. A computer readable medium comprising computer executable instructions adapted to perform the method of claim 15.

* * * * *